United States Patent [19]

Robinson et al.

[11] 4,030,785
[45] June 21, 1977

[54] BEARING CARTRIDGE

[75] Inventors: Elmer D. Robinson; Hilarius S. Struttmann, both of Ithaca, N.Y.

[73] Assignee: Borg-Warner Corporation, Chicago, Ill.

[22] Filed: June 21, 1976

[21] Appl. No.: 697,814

[52] U.S. Cl. .............................. 308/187; 308/194; 308/207 R
[51] Int. Cl.² ......................................... F16C 1/24
[58] Field of Search ............ 308/207, 194, 196, 72, 308/187

[56] References Cited

UNITED STATES PATENTS

| | | | |
|---|---|---|---|
| 3,476,450 | 11/1969 | Grange et al. | 308/207 R X |
| 3,891,286 | 6/1975 | Zimmer et al. | 308/207 |
| 3,957,319 | 5/1976 | Gorski | 308/207 R X |

Primary Examiner—Joseph F. Peters, Jr.
Assistant Examiner—Gene A. Church
Attorney, Agent, or Firm—Aubrey L. Burgess

[57] ABSTRACT

A bearing cartridge of integral construction comprising inner and outer races with sets of rollers therebetween and with an outer cylindrical configuration insertable and removable, as an integral unit, in and from a cylindrical opening in a housing or pillow block.

4 Claims, 4 Drawing Figures

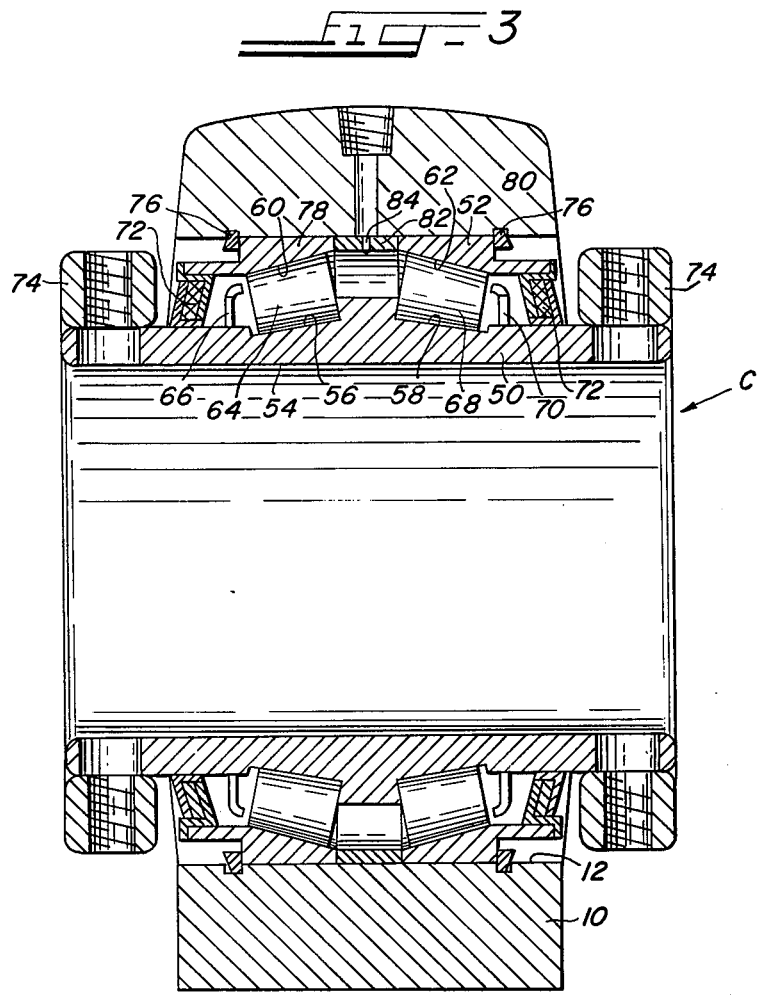

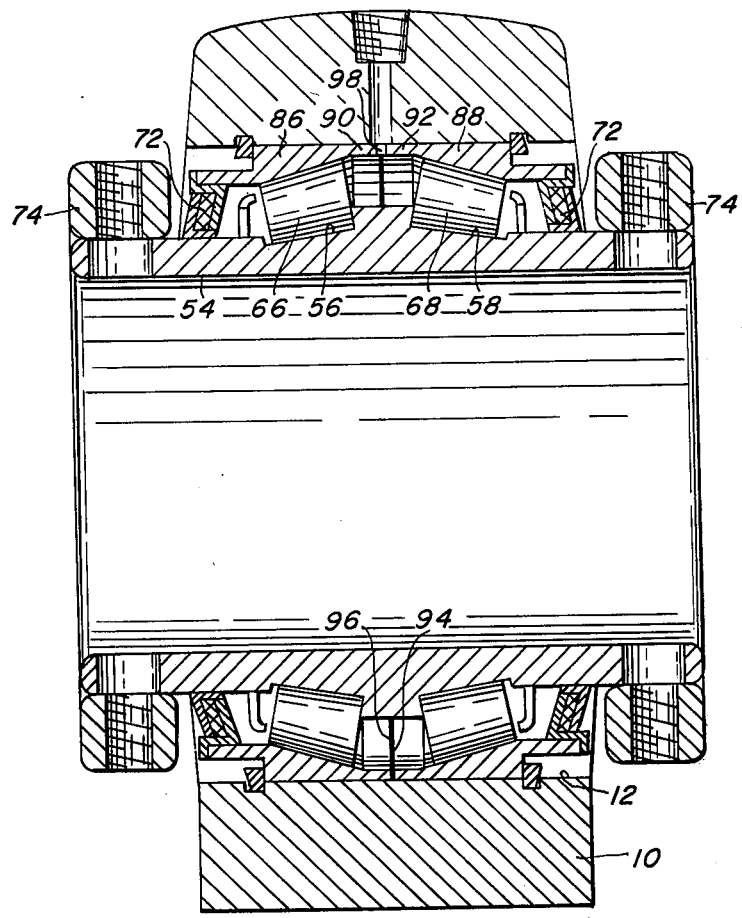

BEARING CARTRIDGE

BACKGROUND OF THE INVENTION

Roller bearings having oppositely disposed inner and outer raceways with sets of rollers therebetween, which raceways are received in a housing and retained therein by snap rings and the like are well known in the art. For example, one form of roller-bearing assembly is manufactured by Dodge Manufacturing Division Reliance Electric Co. of Mishawaka, Indiana, under the designation "Type E Pillow Block." This is a relatively small and compact assembly of the fixed type; i.e., one which will accommodate little or no shaft misalignment, being marketed as assembled, adjusted, sealed and prelubricated at the factory. Unfortunately, upon malfunction, the entire unit must be removed from its operating position and, if to be rebuilt, the various component parts must be removed from the pillow block or housing and then replaced. Replacement requires assembly of the component parts in the housing, adjustment of the parts, resealing and relubrication of the parts. The pillow block can be out of service for the rebuilding time and the unit must be entirely replaced to avoid unduly long shutdowns of the equipment.

THE INVENTION

To avoid long and costly repair of bearings or the replacement of the entire bearing-housing assembly, as described heretofore, there is herein described a bearing cartridge which is a unitary, preadjusted, prelubricated assembly to replace the bearing components in a typical bearing housing. There is no need to rebuild the bearing or to replace the entire bearing-housing assembly.

The cartridge herein described is so constructed with an exterior cylindrical surface of such dimensions to be receivable in a conventional housing or pillow block having a cylindrical bore for the bearing assembly.

The cartridge comprises a unitary assembly of an inner race and an outer race, each having radially oppositely positioned raceways with sets of rollers therebetween. Generally the sets of rollers are each associated with a cage which insures substantially equal spacing of the rollers of each set. The inner race has a cylindrical bore to receive a shaft; the outer race has a cylindrical surface which corresponds to the cylindrical bore of the housing or pillow block. Sealing means are provided between the outer extremities of the races to retain lubricant in the cartridge.

The outer race is constructed of multiple parts integrally joined together. Electron beam welding procedures are preferably employed to join the outer race members. One form of outer race comprises a pair of race members centrally joined by a cylindrical ring spacer. The length of the spacer is so chosen that the spacing of the race members is adjusted for proper operation. The ring spacer is preferably radially drilled to provide an opening through which lubricant is introduced into the bearing; a plug or closure member is used to close the opening until the preassembled, preadjusted, prelubricated cartridge is ready for installation in a housing. The plug can then be removed, so that additional lubricant can be introduced as is required during operation of the bearing. Another form uses a pair of outer race parts joined together.

The cartridge is retained in its housing or pillow block in a conventional manner and can easily be removed for replacement. Generally the original bearing assembly is retained in the housing by snap rings received in spaced annular grooves in the housing which intersect the cylindrical bore therein. In the initial bearing, adjustment of the bearing assembly may be provided by using shims and the like with the snap rings. Shims are unnecessary using the invention herein; however, wedge-shaped snap rings may be desired to retain the cartridge in the housing.

THE DRAWINGS

FIG. 3 is a sectional view of the cartridge of this invention in the housing; and FIG. 4 is a partial sectional view of another embodiment of the cartridge of this invention.

DETAILED DESCRIPTION

Figure 1:
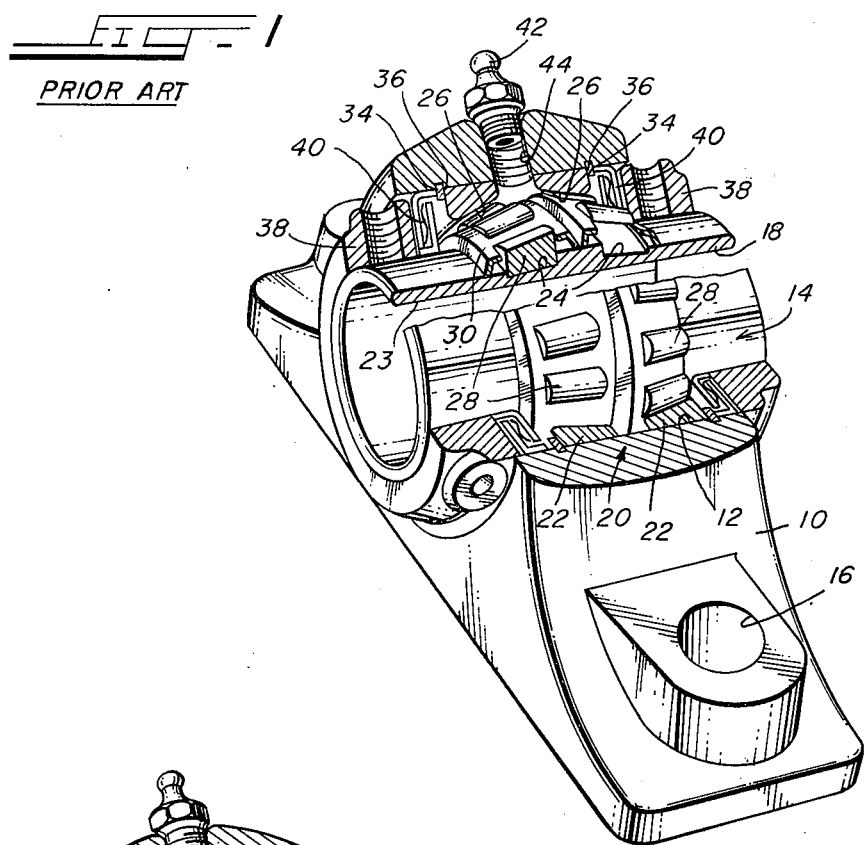
FIG. 1 is a perspective illustration of a conventional bearing-housing assembly with parts cut away to illustrate the bearing details and is identified as "PRIOR ART;"

Looking at FIG. 1 of the drawings, the PRIOR ART bearing-housing assembly comprises the housing 10 having an internal, cylindrical bore 12 which receives a bearing assembly, generally identified as 14. The housing 10 is a pillow block having elongated bolt holes 16 therethrough for connection to a base; the elongated bolt holes permit lateral adjustment of the bearing-housing assembly for its use.

The bearing assembly 14 comprises an inner race 18 and an outer race generally identified as 20, the latter being constructed of unconnected and spaced race members 22. The inner race 18 has an inner bore 23 and space raceways 24, 24 and each of the outer race members 22 has a raceway 26. One raceway 24 is radially opposite a raceway 26 and between each pair of radially opposite raceways 24, 26 is a set of rollers 28 retained in proper spacing in relation to one another by a cage 30. The outer surfaces 32 of the outer race members 22 are cylindrical and conform to the bore 12 of the housing 10.

The bearing assembly 14, as described, is retained in the housing by spaced snap rings 34 each received in a groove 36 intersecting the bore 12 of the housing 10. Collars 38 at the opposite ends of the inner race 18 are used to lock the inner race to the shaft (not shown) received in the bore 23 of the inner race. Between each collar 38 and an outer race member 22 is a grease and dust seal 40.

In order to manufacture such a housing-bearing assembly, it is necessary to assemble the parts in the housing bore. Adjustment of the bearing assembly can be accomplished by using shims (not shown) with the snap rings 34, i.e., the spacing of the outer race members is accomplished when the parts are assembled in the bore 12. Lubricant is introduced in the bearing assembly 14 through a lubricant fitting 42; and passageway 44 in the housing 10, and between the spaced outer race members 22.

Upon malfunction of the bearing as described, it is necessary to remove the shaft from the bearing, remove the housing-bearing assembly from its location, and either replace the entire housing-bearing assembly with another such assembly or rebuild the bearing assembly. Rebuilding the bearing assembly requires removal of the various parts and reconstruction of the bearing including the adjustment of the spacing of the outer race members. This is time consuming and can lead to unnecessary shutdown of the line in which the assembly is used.

Figure 2:
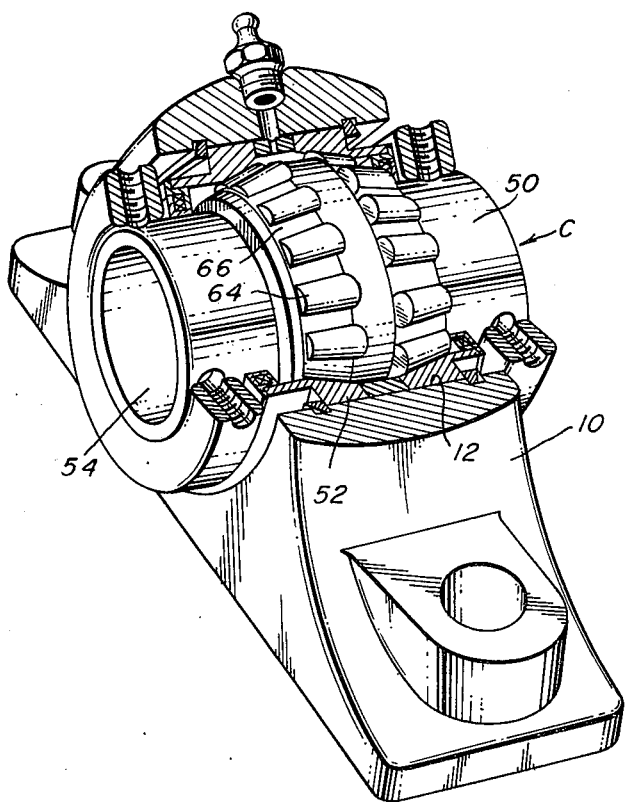
FIG. 2 is a similar illustration showing a cartridge according to this invention in the housing.

Contrast this situation with the invention herein, as illustrated in FIGS. 2 and 3, which shows a preassembled, preadjusted and prelubricated bearing cartridge identified with the letter C constructed to replace the bearing assembly 14 of FIG. 1.

The cartridge C of FIG. 2 is received in the cylindrical bore 12 of the housing 10. The cartridge C comprises an inner race 50 and an outer race 52. The inner race is generally cylindrical with a cylindrical bore 54 therethrough to receive a shaft (not shown). The inner race 50 has spaced raceways 56, 58 and the outer race has radially oppositely spaced raceways 60, 62 respectively. A set of rollers 64 spaced by a cage 66 is disposed between inner and outer raceways 56 and 60, respectively, and a set of rollers 68 spaced by a cage 70 is disposed between inner and outer raceways 58 and 62, respectively. Lubricant and dirt seals 72, 72 are positioned between the inner and outer races 50, 52; as illustrated, collars 74 surrounding the inner race 50 at the extremities are used to lock the cartridge C to the shaft (not shown).

The cartridge C is retained in the bore 12 of the housing 10 by snap rings 76, 76 received in the grooves 36 which intersect the bore 12. These rings 76, 76 may be wedge-shaped in section, as illustrated.

The outer race 52 is of multiple piece construction, and comprises outer race parts 78, 80 joined to a central ring member 82. During the manufacture of the cartridge C, the ring or spacer member is joined to the race parts 78, 80 so that the assembly is a unitary structure. One and preferable method for joining the parts is to employ electron beam welding techniques. The spacer member is provided with a radial opening 84 for a purpose to be described.

Generally a jig or fixture is used on which the parts are assembled. The parts are adjusted for proper spacing with the three-part race member in position; they are held by the jig in their proper positions, and the outer race parts are then joined. After assembly of the parts (including the positioning of the seals 72), lubricant is introduced into the cartridge through the opening 84 which is then stoppered. When the cartridge C is to be used, the stopper for the lubricant passage or opening 84 is removed and the cartridge assembled into the housing.

The embodiment illustrated in FIG. 4 differs from that illustrated in FIG. 2 and 3 in that the outer race parts, identified as 86 and 88, are each provided with a cylindrical extension 90, 92 respectively, terminating in an annular surface 94, 96. The surfaces 94, 96 are joined together in the manufacture of the cartridge. A radial opening 98 corresponds to the opening 84 of the previous embodiment. When the parts are electron beam welded, the weld is interrupted at the opening 98. Other parts are identified as in FIG. 2 and 3.

The manufacturing steps for the FIG. 4 embodiment are similar to those described for the FIGS. 2 and 3 embodiment.

I claim:

1. A bearing cartridge for use in a bearing-housing having a cylindrical bore therethrough for receiving said cartridge, said bore having at least one cylindrical recess therein to receive a snap ring and the like to retain said cartridge in said housing and in operating position, said cartridge comprising a unitary, lubricated and adjusted structure of an inner race member having a central cylindrical bore to receive a shaft and an outer race member with an outer cylindrical surface defining the outer surface of said cartridge, said inner race member having a pair of spaced raceways, said outer race member having a pair of spaced raceways each of which is radially disposed opposite a raceway of said inner race member, a set of rollers positioned between each inner and oppositely disposed outer raceway, and sealing means positioned between the inner race member and the outer race member outwardly of said sets of rollers, said sealing means retaining lubricant in said cartridge, said outer race member being constructed of multiple parts integrally joined to one another, said cartridge being insertable and removable from said housing as a unitary structure and being retained in said housing by a snap ring received in said at least one cylindrical recess in said housing.

2. A bearing cartridge as in claim 1 in which said outer race member comprises a pair of spaced outer race parts each of which has an outer raceway and a central ring-like member.

3. A bearing cartridge as in claim 2 in which said ring-like member is provided with a passageway for the introduction of lubricant into said cartridge.

4. A bearing cartridge as in claim 1 in which said outer race member comprises a pair of spaced outer race parts joined to one another.

* * * * *